(12) United States Patent
Zhong et al.

(10) Patent No.: US 9,172,854 B2
(45) Date of Patent: Oct. 27, 2015

(54) CONFIGURABLE LENS ACTUATOR DRIVER SYSTEM

(71) Applicant: Qualcomm Innovation Center, Inc., San Diego, CA (US)

(72) Inventors: Haibo Zhong, San Diego, CA (US); Hau Ling Hung, San Diego, CA (US); Jeyaprakash Soundrapandian, San Diego, CA (US); Rajakumar Govindaram, San Diego, CA (US); Sreesudhan Ramakrish Ramkumar, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 184 days.

(21) Appl. No.: 13/954,439

(22) Filed: Jul. 30, 2013

(65) Prior Publication Data

US 2015/0038192 A1    Feb. 5, 2015

(51) Int. Cl.
*G03B 13/34* (2006.01)
*H04N 5/225* (2006.01)
*G02B 7/10* (2006.01)
*H04M 1/725* (2006.01)

(52) U.S. Cl.
CPC ............... *H04N 5/225* (2013.01); *G02B 7/102* (2013.01); *H04M 1/72522* (2013.01); *G03B 2205/0053* (2013.01); *H04M 1/72525* (2013.01); *H04M 2250/52* (2013.01)

(58) Field of Classification Search
USPC .................. 348/357, 360, 361; 396/133–136
See application file for complete search history.

(56) References Cited

U.S. PATENT DOCUMENTS

| 6,104,880 | A * | 8/2000 | Kamishita et al. | 396/133 |
|---|---|---|---|---|
| 7,711,260 | B2 * | 5/2010 | Ide et al. | 396/91 |
| 8,208,059 | B2 * | 6/2012 | Nakamura | 348/360 |
| 8,366,001 | B2 * | 2/2013 | Craen et al. | 235/454 |
| 8,964,102 | B2 * | 2/2015 | Christo et al. | 348/349 |
| 8,988,787 | B2 * | 3/2015 | Hung et al. | 359/698 |
| 2008/0259065 | A1 | 10/2008 | Wright et al. | |

* cited by examiner

*Primary Examiner* — Ngoc-Yen Vu
(74) *Attorney, Agent, or Firm* — Neugeboren O'Dowd PC

(57) ABSTRACT

Disclosed are methods and apparatus for utilizing any of a plurality of disparate types of lens actuators on a mobile device. The method may include launching a configurable actuator driver and identifying a particular type of lens actuator that resides on the mobile device. Based upon the particular type of lens actuator that resides on the mobile device, lens-actuator-specific parameter values are obtained that facilitate control interfacing with the particular type of lens actuator. In addition, tuning parameter values are obtained that characterize a displacement-response of the particular type of actuator to control signal values, and the tuning parameter values for the particular type of lens actuator are provided to a configurable lens-actuator driver. The particular type of lens actuator that resides on the mobile computing device is then operated using the tuning parameter values.

18 Claims, 6 Drawing Sheets

Region Table

| Region | Boundary 1 | Boundary 2 | Code per position |
|---|---|---|---|
| Region1 | Position1 | Position3 | 100 |
| Region2 | Position3 | Position7 | 20 |
| Region3 | Position7 | Position15 | 4 |
| ● ● ● | | | |
| RegionN | PositionK | PositionM | x |

FIG. 2A

Step Table

| Step | Code Value |
|---|---|
| Position 1 | Value 1 |
| Position 2 | Value 2 |
| | |

⋮ Region 1

| Position n | Value n |
|---|---|

| Position n1 | Value n1 |
|---|---|
| Position n2 | Value n2 |
| | |

⋮ Region 2

| Position m | Value m |
|---|---|

| Position m1 | Value m1 |
|---|---|
| Position m2 | Value m2 |
| | |

⋮ Region N

| Position k | Value k |
|---|---|

FIG. 2B

Forward Direction

Scenario 1
- Region 1
  - Step = 4
  - Delay = 2000
  - H.W. Parameter = xx
- Region 2
  - Step = 8
  - Delay = 3500
  - H.W. Parameter = xx
  - ⋮
- Region N
  - Step = 10
  - Delay = 5000
  - H.W. Parameter = xx Scenario 2
- Region 1
  - Step = 2
  - Delay = 1500
  - H.W. Parameter = xx
- Region 2
  - Step = 6
  - Delay = 2500
  - H.W. Parameter = xx
  - ⋮
- Region N
  - Step = 8
  - Delay = 3500
  - H.W. Parameter = xx
  - ⋮

Scenario M
- Region 1
  - Step = 6
  - Delay = 2500
  - H.W. Parameter = xx
- Region 2
  - Step = 10
  - Delay = 5000
  - H.W. Parameter = xx
  - ⋮
- Region N
  - Step = 20
  - Delay = 10000
  - H.W. Parameter = xx

Reverse Direction

Scenario 1
- Region 1
  - Step = 2
  - Delay = 1000
  - H.W. Parameter = xx
- Region 2
  - Step = 4
  - Delay = 2500
  - H.W. Parameter = xx
  - ⋮
- Region N
  - Step = 8
  - Delay = 3500
  - H.W. Parameter = xx Scenario 2
- Region 1
  - Step = 4
  - Delay = 2000
  - H.W. Parameter = xx
- Region 2
  - Step = 8
  - Delay = 3500
  - H.W. Parameter = xx
  - ⋮
- Region N
  - Step = 10
  - Delay = 5000
  - H.W. Parameter = xx
  - ⋮

Scenario K
- Region 1
  - Step = 2
  - Delay = 1500
  - H.W. Parameter = xx
- Region 2
  - Step = 6
  - Delay = 2500
  - H.W. Parameter = xx
  - ⋮
- Region N
  - Step = 8
  - Delay = 3500
  - H.W. Parameter = xx

FIG. 2C

CONFIGURABLE LENS ACTUATOR DRIVER SYSTEM

BACKGROUND

1. Field

The present invention relates to computing devices. In particular, but not by way of limitation, the present invention relates to apparatus and methods that enable control of hardware devices of computing devices.

2. Background

Mobile computing devices such as smartphones, netbooks, gaming devices, PDAs, and laptops now typically include a variety of hardware devices such as cameras, and these mobile computing devices are now capable of running relatively sophisticated operating systems that enable users to interact with the hardware devices in a simplified and often intuitive manner.

The cameras that are now available in mobile computing devices, for example, include camera lens actuators (e.g., voice coil motor (VCM) and piezoelectric actuators) that are very popular and widely used. These actuators are used to drive the optical lens set of the camera along the optical axis to achieve a desired focus. An important aspect of controlling the focus of the lens set is to control the lens motion with optical precision. Known detrimental factors that interfere with the precision control of these lens sets are: 1) linear sub-optimal lens movement and 2) ringing. These two factors can be corrected using a tuning process that is used to derive characterization parameters that vary for the different types of actuators-lens combination. Currently, different software drivers are developed for each type of actuator that incorporates the tuning parameters.

As a consequence, ongoing maintenance of the actuator drivers is difficult because changes must be made to each of the different actuator drivers. And in addition, whenever new actuator hardware is developed, the vendors must expend time and resources developing new corresponding drivers. Accordingly, the current approach to device driver deployment is less than ideal and will most certainly not be satisfactory in the future.

SUMMARY

Some aspects of the present invention may be characterized as a method for utilizing any of a plurality of disparate types of lens actuators on a computing device. The method may include launching a configurable actuator driver and dynamically identifying a particular type of lens actuator that resides on the computing device. Based upon the particular type of lens actuator that resides on the computing device, lens-actuator-specific parameter values are obtained that facilitate control interfacing with the particular type of lens actuator. In addition, tuning parameter values are obtained that characterize a displacement-response of the particular type of actuator to control signal values, and the tuning parameter values for the particular type of lens actuator are provided to a configurable lens-actuator driver. The particular type of lens actuator that resides on the computing device is then operated using the control parameters and smooth lens movement is achieved using the tuning parameter values.

Other aspects may be characterized as a mobile device including a resident lens actuator and configurable actuator data including a plurality of sets of tuning parameters for a plurality of disparate lens actuators, including the resident lens actuator, and each of the plurality of sets of tuning parameters characterizes a corresponding one of a plurality of the disparate lens actuators. A configurable lens-actuator driver operates in connection with any of the plurality of disparate lens actuators, including the resident lens actuator, by utilizing the plurality of sets of tuning parameters.

BRIEF DESCRIPTION OF THE DRAWINGS

FIG. 2A is a diagram depicting an exemplary region table;

FIG. 2B is a diagram depicting an exemplary step table;

FIG. 2C is a diagram depicting a table that includes exemplary ringing scenarios;

DETAILED DESCRIPTION

Figure 1:
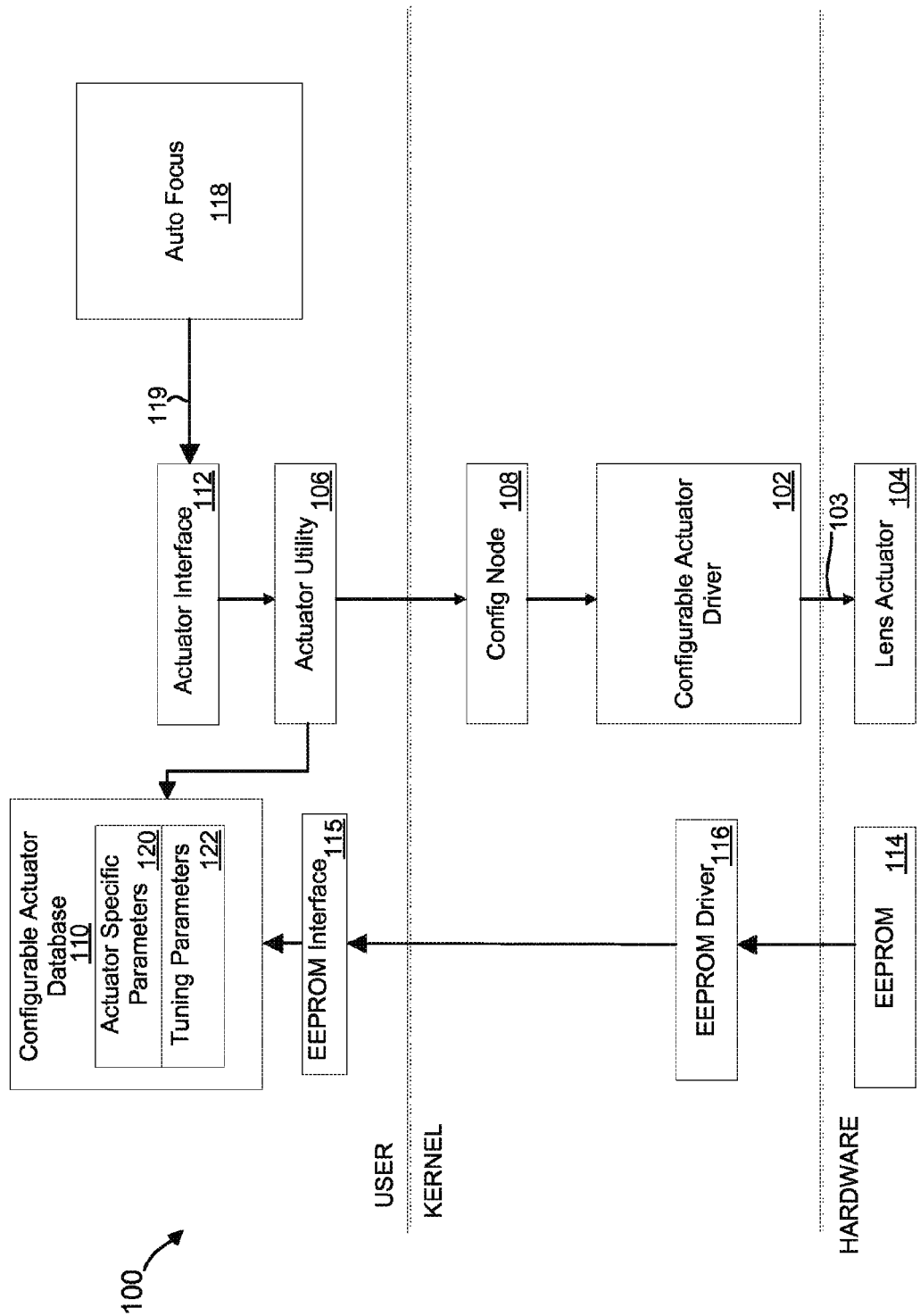
FIG. 1 is a is a block diagram depicting an exemplary mobile device.

Referring first to FIG. 1, it is a block diagram depicting components of an exemplary computing device 100 (e.g., a smartphone, netbook, gaming device, PDA, or tablet) in which a configurable actuator driver 102 may be implemented. In general, the configurable actuator driver 102 is designed to operate in connection with a variety of different types of lens actuators. In the embodiment depicted in FIG. 1, for example, the configurable actuator driver 102 is designed to operate in connection with voice coil motor (VCM) actuators, piezoelectric actuators, stepper motors, micro electro mechanical systems (MEMS), shape memory alloy (SMA) actuators, and yet-to-be-developed actuators. More specifically, the configurable actuator driver 102 is designed to operate in connection with many different types of lens actuators, and improve the operation of many lens actuators, by utilizing separate tuning parameters and/or tuning parameter values that are specific to each lens actuator. As a consequence, the single configurable actuator driver 102 may replace the plurality of different and distinct actuator drivers that are currently used to operate with different lens actuators.

As shown, in this embodiment the configurable actuator driver 102 is realized in kernel space (e.g., Linux kernel) of the computing device 100 and is in communication with both, a lens actuator 104 (that is a hardware component) and an actuator utility component 106 (via a configuration node 108), which resides in user space of the computing device 100. Although not depicted, it is certainly contemplated that if the computing device includes other lens actuators (e.g., of different types than the depicted lens actuator 104), then other instances of the configurable actuator driver 102 would reside in the kernel space and these other instances of the configurable actuator driver 102 would be configured, using tuning parameters associated with the other lens actuators, to control the other lens actuators. Also coupled to the actuator utility component 106 are a configurable actuator database 110 and an actuator interface 112. In this embodiment, the configurable actuator database 110 is in communication with EEPROM 114 via an EEPROM interface 115 and an EEPROM driver 116, and the actuator interface 112 is in communication with an autofocus component 118. It should be recognized that the depicted components in FIG. 1 is a logical depiction of functional components and that there may be several constructs (which may be realized by hardware, software, firmware, and combinations thereof) that underlie each of the components depicted in FIG. 1. As a consequence, there may be common constructs that are used to realize many of the depicted components in FIG. 1, and some of the functions depicted in FIG. 1 may be distributed across several hardware, software, and/or firmware components.

In general, the lens actuator 104 drives an optical lens set of a camera (not shown in FIG. 1) by moving along an optical axis to achieve autofocusing and/or zooming functions (e.g., to zoom in and out). More specifically, the lens actuator 104 receives digitally-represented code values as an input (from the configurable actuator driver 102) that correspond to lens movement, and the lens actuator 104 converts the digitally-represented code values to analog signals that are translated into movement by electromechanical components of the lens actuator 104. These electromechanical components are well known to those of ordinary skill in the art, and as a consequence, are not depicted in FIG. 1 for clarity. The lens actuator 104 may be realized by a VCM actuator, piezoelectric actuator, a stepper motor, MEMS-type actuator, SMA-type actuator, and yet-to-be developed actuators. As discussed further herein, differences between each of the variety of different types of actuators may be characterized in terms of parameter values that are specified in the configurable actuator database 110.

The configurable actuator driver 102 generally functions to control the lens actuator 104 responsive to control calls from the user space (e.g., a runtime command 119 originating from the autofocus component 118). But unlike prior actuator drivers, which are specifically designed to control a particular type of lens actuator, the depicted configurable actuator driver 102 is designed as a generic driver that is configurable to control a variety of different types of lens actuators using data from the configurable actuator database 110. The autofocus component 118 may execute a variety of algorithms to prompt specific types of lens movement, which are effectuated using parameter values that are specific to the type of lens actuator that is utilized.

As shown, the configurable actuator database 110 in the exemplary embodiment depicted in FIG. 1, includes actuator specific parameters 120 and tuning parameters 122. In some embodiments, the actuator specific parameters 120 and tuning parameters 122 are stored in the EEPROM 114 and loaded to the user space during startup of a camera application. In other embodiments, the actuator specific parameters 120 and tuning parameters 122 are stored in a file in non-volatile memory.

The actuator specific parameters 120 in this embodiment are lens-actuator-specific parameters, which may identify the type of actuator and facilitate control and communication interfacing (e.g., control protocol/addressing) with the specific type of lens actuator 104 that is implemented on the computing device 100. For example, the actuator specific parameters 120 may include parameter values to identify an I2C slave address, type of actuator (e.g., VCM, piezo, etc.), DAC precision (number of bits), and register address/data type (Byte/Word).

The tuning parameters 122 generally characterize a displacement-response of the particular type of actuator to control signal 103 values. In other words, values of the tuning parameters 122 characterize how the lens actuator 104 responds (in terms of displacement) to the control signals 103. The tuning parameters 122 may be organized in terms of regions (e.g., an initial region, non-linear region, and linear region); data lens-movement scenarios (direction and lens movement range); and damping parameter values (e.g., step and delay values) that are based upon the ringing scenarios. Each of the regions may be characterized by data values that relate displacement of the particular type of lens actuator 104 to control signal information in that region.

Referring briefly to FIG. 2A shown is a representation of an exemplary structure of a region table that may be used to realize each of the region tables. As shown, the region table in FIG. 2A includes N regions, and each of the regions includes data that characterizes a particular region of operation of a lens actuator. The region table characterizes the regions by specifying region boundaries using position values and the change-of-code-value per position in that particular region. And as one of ordinary skill in the art will appreciate in view of this disclosure, some actuators respond (in terms of displacement) in a nonlinear manner to control signals, and the nonlinearity may vary over the operating range of the lens actuator. Beneficially, the regional organization of the region table depicted in FIG. 2A enables the different operating ranges of an actuator to be separately characterized in the N regions of the region table.

Although the value of N may certainly vary, in some implementations N is three and a first of the three regions is an initial region that generally includes data characterizing a position of the lens actuator 104 relative to the drive signal 103 applied to the lens actuator 104 during an initial range of movement of the lens actuator 104, which may include data for the lens actuator 104 when the lens actuator 104 is not moving. The second region may be characterized as non-linear region, which includes data associated with a non-linear range of operation of the lens actuator 104 (e.g., in which a position of the lens actuator 104 varies in a non-linear manner in relation to the drive signal 103 that is applied to the lens actuator 104). And the third region may be a linear range of movement during which the position of the lens actuator 104 generally changes in a linear manner in relation to the drive signal 103 that is applied to the lens actuator 104.

Beneficially, the N-region organization of the region table enables a variety of different types of lens actuators to be more effectively characterized in terms of control regions—even if a particular actuator does not have a range of operation that fits into one or more of the N regions. For example, the operating characteristics of a voice coil motor (VCM) actuator typically include three ranges of operation: 1) a range of operation that may be a non-moving range of operation (e.g., where the actuator stays at a resting or zero position even when a non-zero drive signal is applied to the actuator); 2) a range of operation where the actuator moves non-linearly relative to a drive signal; and 3) a range of operation where the actuator moves linearly relative to the drive signal. As a consequence, a 3-region table may be populated with tuning parameter values that vary in each of the three regions. As another example, the operating characteristics of a piezoelectric actuator typically include a single range of operation—a linear range of operation. And as a consequence, only one entry in the region table may be needed, which may accommodate the linear data for the piezoelectric actuator. Similarly, other yet-to-be-developed actuator technologies may be characterized by tuning parameters that may populate one, all of the N regions, or fewer than the N regions.

In many implementations, the region tables are generated in advance of the computing device 100 being distributed to end consumers. For example, each of a plurality of different types of actuators may be tested using a laser-measuring tool to capture displacement of the lens actuator 104 versus an indicator of the drive signal applied to the lens actuator 104 (e.g., a code value that represents the drive signal (e.g., voltage or current) that is applied to the actuator). For example, for each lens actuator the drive signal (which may be represented by a DAC code value) is varied (e.g., for each of 40 steps) and the displacement is measured for each drive setting.

In some implementations, tuning parameters from a vendor of the lens actuator 104 may be stored in EEPROM 114, which may reside on an actuator module itself, and in these implementations, the tuning parameters may be read from EEPROM 114 and then used to populate a region table stored in the tuning parameters 122 portion of the configurable actuator database 110. The region table is then used to generate a corresponding step table in the configurable actuator driver 102 described further herein below.

The damping parameters in the configurable actuator database 110 include parameter values that are specific to arresting ringing that may occur, and these parameter values are based upon what an autofocus algorithm of the autofocus component 118 "expects." For example, if the autofocus component 118 determines that the lens actuator needs to move from position "x" to position "y," a particular damping parameter value may be retrieved from the damping parameters 124 and passed to the configurable actuator driver 102 to reduce ringing that is prone to occur in varying degrees based upon the type of lens actuator 104 that is utilized in the computing device 100. Ringing in this context is the path the lens moves after an impulse-type of change (e.g., step change) in movement (e.g., responsive to a voltage or current change). As discussed further below, the damping time and damping step vary for each type of movement scenario in the different operating regions, and may also vary based upon the direction and the range of lens movement.

For example, VCM actuators will often experience ringing when the control-step change is large over a short period of time. As a consequence, the damping table includes, for each type of lens actuator, delay and/or step-modeling (dividing into multiple small steps) data based upon movement scenarios (e.g., coarse search, fine search, random positioning) depending on whether the movement is forward or backward, and the damping data may also vary depending on the particular region the actuator is operating in within the step table. As a consequence, depending upon the type of movement requested (e.g., that the autofocus component 118 may request) during operation, the configurable actuator driver 102 may control the actuator (e.g., VCM actuator) in a manner that reduces ringing (e.g., by reducing step sizes and/or introducing delay) by using the damping parameter values associated with the particular type of lens actuator that is implemented.

Referring to FIG. 2C for example, shown are exemplary damping parameter values (step and delay values) for both forward and reverse direction scenarios that may reside in the tuning parameters 122 of the configurable actuator database 110. More specifically, for each of the forward and reverse directions, there are a plurality of scenarios, and each of the scenarios is associated with a range of operation of the lens actuator. For example, for movements in the forward direction, there are M scenarios and each of the M scenarios is associated with a range of movement. Scenario 1 in the forward direction may, for example, correspond to movement from a position "x" to a position "y," and scenario 2 may correspond to lens actuator 104 movement from a position "y" to a position "z." As depicted, each scenario may be organized into a plurality of regions, and each of the regions in a scenario is characterized by a step and delay parameter value pair. Scenario 1, for example, includes N regions and N corresponding step and delay parameter value pairs. Each step and delay parameter value pair includes a step value and a delay value.

As shown, for the reverse direction (which is similar to the forward direction in terms of data organization), there are K scenarios and each of the K scenarios includes N regions. As depicted, each of the N regions is associated with a step value and a delay value (a step and delay parameter value pair). The depicted damping parameter values in FIG. 2C are software damping parameter values, but as shown the table depicted in FIG. 2C may also include hardware damping parameter values in the event the lens actuator 104 supports hardware damping parameter values. As one of ordinary skill in the art will appreciate, the value "xx" for the hardware damping parameters varies with the type of hardware that is utilized to realize the lens actuator, and as a consequence, specific exemplary values are not depicted.

In the embodiment depicted in FIG. 1, a step table is generated and stored at the kernel level in connection with the configurable actuator driver based upon the region table associated with the type of lens actuator that is in use. As shown in FIG. 2B, which depicts an exemplary step table, once generated, a step table may include, for each of a plurality of steps (e.g., 40 steps) corresponding to a position of the lens actuator 104, a code value (also referred to as a DAC value) that is indicative of a signal that must be applied to the lens actuator.

When the lens actuator 104 is realized by a piezoelectric actuator, because many piezoelectric actuators move step-by-step responsive to being pulsed by a drive signal, the step table may include data that is indicative a number of pulses required to move the actuator a step distance. And with respect to VCM actuators, the step table may include, for each of several steps, a code value that is indicative of a drive signal that must be applied to the VCM actuator to move the actuator to arrive at the specific step.

As shown in FIG. 2A, the region table holds the region boundaries specified in terms of the position value associated with the step table. It also characterizes the code value change between each position value of the step table. And as shown in FIG. 2B, the step table is organized to include, for each region, a plurality of data pairs, and each of the data pairs includes a position value and a corresponding code value.

In the exemplary embodiment, the actuator utility component 106 also receives the actuator specific parameter values, the damping parameter values, and the tuning parameter values for the particular lens actuator that resides on the computing device from the configurable actuator database 110, and this information is passed along to the configurable actuator driver 102. In operation (e.g., when a camera application utilizes the autofocus (AF) functions provided by the autofocus component 118), the step table is accessed by the configurable actuator driver 102 based upon the desired movement of the lens actuator 104 (e.g., to achieve a desired focus as determined by the autofocus component 118) to obtain the code value associated with the desired movement.

Beneficially, in many implementations the actuator utility component 106 is designed to operate as a general control component in connection with a variety of different types of lens actuators (e.g., different models and/or different manufacturers), and as a consequence, the computing device depicted in FIG. 1 need not include a different actuator utility component 106 for each lens actuator. More specifically, as shown in FIG. 1, the actuator utility component 106 is designed to receive values of the actuator specific parameters from the configurable actuator database 110. And if the computing device 100 includes multiple, different types of lens actuators, additional actuator specific parameter values, the damping parameter values, and the tuning parameter values will reside in the configurable actuator database 110 and each step table will be derived using the above parameters that are specific to the corresponding lens actuator 104.

Again, it should be recognized that FIG. 1 is intended to be a high-level depiction of the computing device 100 and that the depicted arrangement of the components depicted in FIG. 1 is logical, the connections between the various components are exemplary only, and the depiction of this embodiment is not meant to be an actual hardware diagram; thus, the components can be combined or further separated in an actual implementation, and the components can be connected in a variety of ways without changing the basic operation of the system.

Beneficially, the embodiments described herein enable lens actuator control for a variety of lens actuator types without having to create separate drivers for each actuator. And in addition, embodiments herein improve the software development cycle by improving implementation and providing simpler maintenance because maintenance need only be done on the configurable actuator driver 102. For example, a simple update to the configurable actuator database 110 replaces the onerous task of creating new lens actuator drivers. More specifically, parameter values may easily be added to the configurable actuator database 110 in contrast to changing code in actuator driver files, which is required in prior approaches having different drivers for different types of lens actuators. Moreover, embodiments described herein enable users to configure the configurable actuator driver 102 to effectively operate as their own actuator driver for a particular lens actuator by simply plugging in the actuator-specific parameters and its associated tuning parameters of the particular lens actuator in the configurable-actuator database 110. Yet another advantage of some embodiments is an improvement in the ease and utilization of proprietary image processing solutions.

Figure 3:
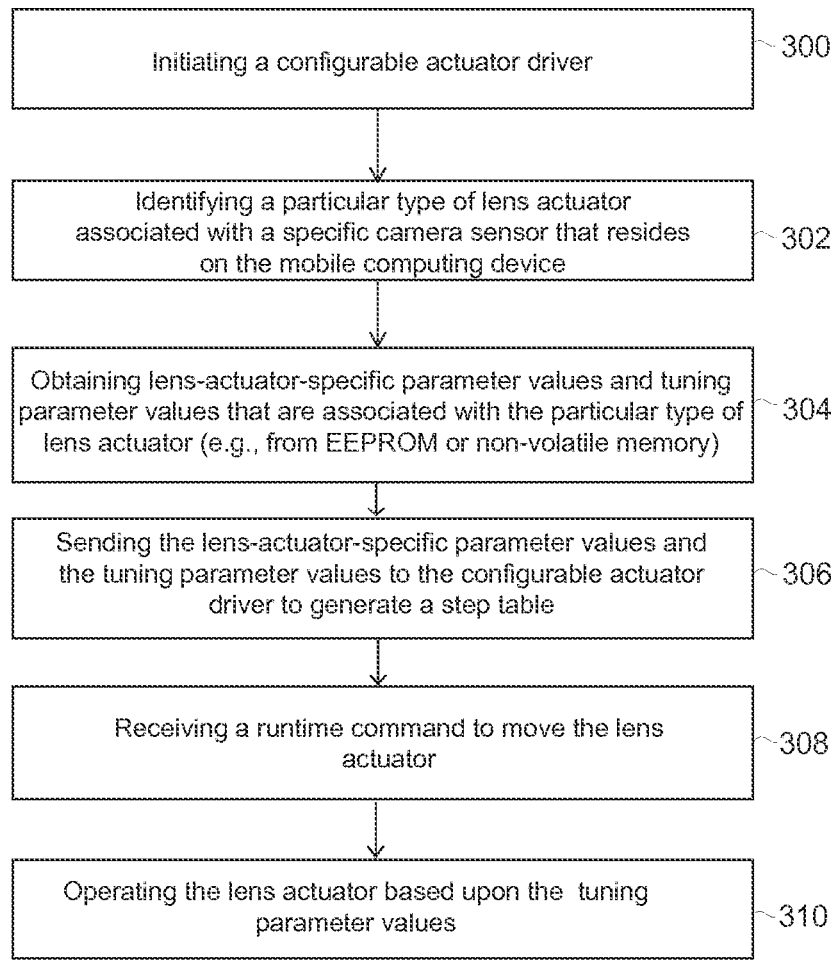
FIG. 3 is a flow chart depicting a method that may be traversed in connection with embodiments described herein.

Referring next to FIG. 3, it is a flowchart depicting an exemplary method that may be traversed by the components of the computing device 100 depicted in FIG. 1, but it should be recognized that the depicted steps may be interchanged without departing from the scope of the invention. As shown in FIG. 3, during boot up, the configurable actuator driver 102 is initiated at 300, and the particular type of lens actuator (associated with a specific camera actuator) that resides on the computing device 100 is identified at 302. In some embodiments, information stored in EEPROM 114, which may be integrated into a lens module, is used to identify the type of sensor that is used in the lens module, and the configurable actuator database 110 maps the sensor type to a particular actuator type.

As shown in FIG. 3, based upon the type of lens actuator 104 that resides on the computing device 100, lens-actuator-specific parameter values (e.g., actuator specific parameter values 120) and tuning parameter values (e.g., tuning parameters 122) are obtained at 304 from the configurable actuator database 110. For example, the lens-actuator-specific parameter values may include parameter values that identify an I2C slave address, type of actuator, digital-to-analog (DAC) precision value, and register address/data type information. As discussed above, the tuning parameters (e.g., tuning parameters 122) may include data that associates actuator positions with digital-to-analog conversion (DAC) values, ringing scenarios (e.g., direction and movement range), and damping parameters (e.g., step and delay values) for software and/or hardware based upon the ringing scenarios.

As depicted at 306, the lens-actuator specific parameter values and the tuning parameter values are sent to the configurable actuator database 110 to generate a step table (e.g., the step table depicted in FIG. 2B), which may be stored in connection with the configurable actuator driver 102 at the kernel layer. In operation, when the actuator interface 112 receives the runtime command 119 from the autofocus component 118 to initiate movement of the lens actuator 104 at step 308, in the embodiment depicted in FIG. 1, the actuator utility component 106 determines the distance the lens needs to move and the number of steps required to move the lens that distance. The actuator utility component 106 then sends the lens-actuator-specific parameter values and the tuning parameter values to the configurable actuator driver 102 via the configuration node 108, which operates as an abstraction to the configurable actuator driver 102. The configurable actuator driver 102 then operates the lens actuator 104 based upon the tuning parameter values at step 310.

For example, using identifying information for the lens actuator 104 the actuator utility component 106 obtains a particular region table (from among several region tables) that corresponds to the resident lens actuator 104 and the region of operation that the lens actuator 104 is operating within. And in addition, based upon the movement requested by the autofocus component 118, damping parameter values are selected by the actuator utility component 106. As one of ordinary skill in the art will appreciate in view of this disclosure, the damping time and step to reduce ringing will vary based upon the movement of the lens actuator 104 in the different regions, and also based upon the direction and the range of lens movement. The configurable actuator driver 102 then operates the lens actuator 104 based upon the damping parameter values (step 310). It should be recognized that not all actuators require damping, and for these types of actuators (e.g., piezoelectric actuators) the damping values may not be used at all or may be null values, or another value may be used to indicate that no damping is required.

As discussed above, the values from the actuator specific parameters 120 may include parameter values that identify an I2C slave address, digital-to-analog (DAC) precision value, and register address/data type information; thus the lens-actuator-specific control parameter values obtained at 304 facilitate control interfacing (carried out by the configurable actuator driver) with the lens actuator 104.

Figure 4:
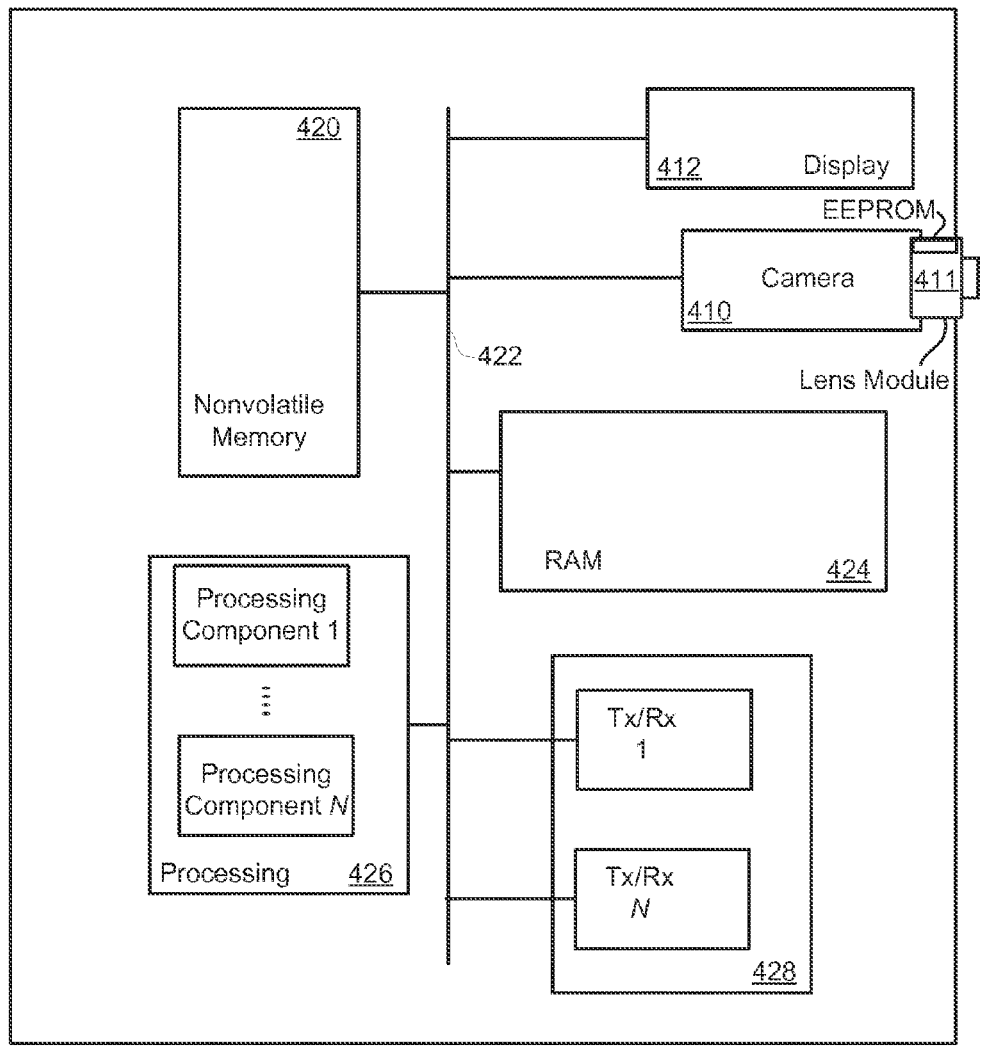
FIG. 4 is a block diagram depicting physical components of an exemplary mobile device.

Referring to FIG. 4, shown is a block diagram depicting exemplary physical components that may be used in connection with realizing the components depicted in FIG. 1. As shown, a camera 410 (including lens module 411), display 412, and nonvolatile memory 420 are coupled to a bus 422 that is also coupled to random access memory ("RAM") 424, a processing portion (which includes N processing components) 426, and a transceiver component 428. Although the components depicted in FIG. 4 represent physical components of a mobile computing device (such as the computing device 100 depicted in FIG. 1) it is not intended to be a hardware diagram; thus many of the components depicted in FIG. 4 may be realized by configurable constructs or distributed among additional physical components. Moreover, it is certainly contemplated that other existing and yet-to-be developed physical components and architectures may be utilized to implement the functional components described with reference to FIG. 1.

In general, the nonvolatile memory 420 functions to store (e.g., persistently store) data and executable code including code that is associated with the functional components depicted in FIGS. 1. In some embodiments of the computing device 100 depicted in FIG. 1 for example, the nonvolatile memory 420 includes bootloader code, modem software, operating system code (including code for the configurable actuator driver 102), file system code, the data in the configurable actuator database 110, and code to facilitate the implementation of one or more portions of the actuator utility component 106, actuator interface 112, and autofocus component 118. In other embodiments, the data in the configurable actuator database 110 is brought into RAM 424 from EEPROM of the lens module 411 when the mobile device is booted up.

In many implementations, the nonvolatile memory 420 is realized by flash memory (e.g., NAND or ONENAND™ memory), but it is certainly contemplated that other memory types may be utilized as well. Although it may be possible to execute the code from the nonvolatile memory 420, the executable code in the nonvolatile memory 420 is typically loaded into RAM 424 and executed by one or more of the N processing components in the processing portion 426.

The lens module 411 in the embodiment depicted in FIG. 4 may be realized by a variety of different sensor and actuator types. For example, the actuator types may include voice coil motor (VCM) type actuators, piezoelectric actuators, hybrid actuators, and yet-to-be-developed actuators.

The processing portion 426, in connection with RAM 424, generally operates to execute the instructions stored in nonvolatile memory 420 to effectuate the functional components depicted in FIG. 1. As one of ordinarily skill in the art will appreciate, the processing components 426 may include a video processor, modem processor, DSP, graphics processing unit (GPU), and other processing components.

The depicted transceiver component 428 includes N transceiver chains for communicating with external devices. Each of the N transceiver chains represents a transceiver associated with a particular communication scheme. For example, one transceiver chain may operate according to wireline protocols, another transceiver may communicate according to WiFi communication protocols (e.g., 802.11 protocols), another may communicate according to cellular protocols (e.g., CDMA or GSM protocols), and yet another may operate according to Bluetooth protocols. Although the N transceivers are depicted as a transceiver component 428 for simplicity, it is certainly contemplated that the transceiver chains may be separately disposed about the mobile computing device.

This display 412 generally operates to display content (including images captured by the camera 410) to a user, and it may also operate as an input device when implemented as a touchscreen. Although not depicted for clarity, one of ordinary skill in the art will appreciate that other components including a display driver and backlighting (depending upon the technology of the display) are also associated with the display 412.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

What is claimed is:

1. A method for utilizing any of a plurality of disparate types of lens actuators on a mobile computing device comprising:
    launching a configurable actuator driver;
    identifying a particular type of lens actuator that resides on the mobile computing device;
    obtaining lens-actuator-specific parameter values that facilitate control interfacing with the particular type of lens actuator that resides on the mobile computing device;
    obtaining tuning parameter values that characterize a displacement-response of the particular type of actuator to control signal values;
    loading the lens-actuator-specific parameter values and tuning parameter values to user space;
    providing the lens-actuator-specific parameter values and the tuning parameter values of the particular type of lens actuator to the configurable lens-actuator driver; and
    operating the particular type of lens actuator that resides on the mobile computing device according to the tuning parameter values.

2. The method of claim 1, wherein obtaining tuning parameter values that characterize the displacement-response includes obtaining tuning parameter values that characterize the displacement-response over one of a plurality of operating regions.

3. The method of claim 1, including:
    retrieving, based upon a runtime lens-movement command and the particular type of lens actuator, damping parameters; and
    providing the damping parameters to the configurable lens-actuator driver.

4. The method of claim 1, wherein obtaining lens-actuator-specific parameter values includes obtaining parameter values selected from the group consisting of I2C slave address value, DAC precision value, and register address/data type.

5. The method of claim 1, wherein identifying the type of lens actuator includes identifying a type of sensor that resides on the mobile computing device and using the type of sensor to identify the particular type of lens actuator.

6. The method of claim 1 including:
generating a step table that is stored at kernel level with the configurable actuator driver, the step table including data that relates displacement of the particular type of lens actuator to digital-to-analog control values.

7. A mobile device, comprising:
a resident lens actuator;
configurable actuator data in user space including a plurality of sets of tuning parameters for a plurality of disparate lens actuators, including the resident lens actuator, each of the plurality of sets of tuning parameters characterizing a corresponding one of a plurality of the disparate lens actuators;
wherein the configurable actuator data includes lens-actuator-specific parameter values that facilitate control interfacing with the plurality of corresponding disparate lens actuators, including the resident lens actuator;
wherein the lens-actuator-specific parameter values include parameter values selected from the group consisting of an I2C slave address value, DAC precision value, and register address/data type; and
a configurable lens-actuator driver that operates in connection with any of the plurality of disparate lens actuators, including the resident lens actuator, by utilizing the plurality of sets of tuning parameters, the configurable lens-actuator driver using a particular set of tuning parameters to operate in connection with the resident lens actuator.

8. The mobile device of claim 7, wherein each of the sets of tuning parameters is organized to characterize the displacement-response of each of the plurality of the disparate lens actuators over one of a plurality of operating regions.

9. The mobile device of claim 7, wherein the configurable actuator data includes damping parameter values that are associated with lens displacement information.

10. A non-transitory, tangible computer readable storage medium, encoded with processor readable instructions to perform a method for utilizing any of a plurality of disparate types of lens actuators, the method comprising:
launching a configurable actuator driver;
identifying a particular type of lens actuator that resides on the mobile computing device;
obtaining lens-actuator-specific parameter values that facilitate control interfacing with the particular type of lens actuator that resides on the mobile computing device;
obtaining tuning parameter values that characterize a displacement-response of the particular type of actuator to control signal values;
loading the lens-actuator-specific parameter values and tuning parameter values to user space;
providing, utilizing the lens-actuator-specific control parameter values, the tuning parameter values of the particular type of lens actuator to a configurable lens-actuator driver; and
operating the particular type of lens actuator that resides on the mobile computing device according to the tuning parameter values.

11. The non-transitory, tangible computer readable storage medium of claim 10, wherein obtaining tuning parameter values that characterize the displacement-response includes obtaining tuning parameter values that characterize the displacement-response over one of a plurality of operating regions.

12. The non-transitory, tangible computer readable storage medium of claim 10, including:
retrieving, based upon a runtime lens-movement command and the particular type of lens actuator, damping parameters; and
providing the damping parameters to the common configurable lens-actuator driver.

13. The non-transitory, tangible computer readable storage medium of claim 10, wherein obtaining lens-actuator-specific parameter values includes obtaining parameter values selected from the group consisting of I2C slave address value, DAC precision value, and register address/data type.

14. The non-transitory, tangible computer readable storage medium of claim 10, wherein identifying the type of lens actuator includes identifying a type of sensor that resides on the mobile computing device and using the type of sensor to identify the particular type of lens actuator.

15. The non-transitory, tangible computer readable storage medium of claim 10 including:
generating a step table that is stored at kernel level with the configurable actuator driver, the step table including data that relates displacement of the particular type of lens actuator to digital-to-analog control values.

16. A mobile communication device comprising:
means for launching a configurable actuator driver;
means for identifying a particular type of lens actuator that resides on the mobile computing device;
means for obtaining lens-actuator-specific parameter values that facilitate control interfacing with the particular type of lens actuator that resides on the mobile computing device;
means for obtaining tuning parameter values that characterize a displacement-response of the particular type of actuator to control signal values;
means for loading the lens-actuator-specific parameter values and tuning parameter values to user space;
means for providing, utilizing the lens-actuator-specific control parameter values, the tuning parameter values of the particular type of lens actuator to the configurable lens-actuator driver; and
means for operating the particular type of lens actuator that resides on the mobile computing device according to the tuning parameter values.

17. The mobile communication device of claim 16, wherein the means for obtaining tuning parameter values that characterize the displacement-response includes means for obtaining tuning parameter values that characterize the displacement-response over one of a plurality of operating regions.

18. The mobile communication device of claim 16, including:
means for retrieving, based upon a runtime lens-movement command and the particular type of lens actuator, damping parameters; and
means for providing the damping parameters to the configurable lens-actuator driver.

* * * * *